March 4, 1930.  A. FORBERG  1,749,633
MACHINE FOR BROACHING SPIRALS
Filed Jan. 27, 1928    2 Sheets-Sheet 1
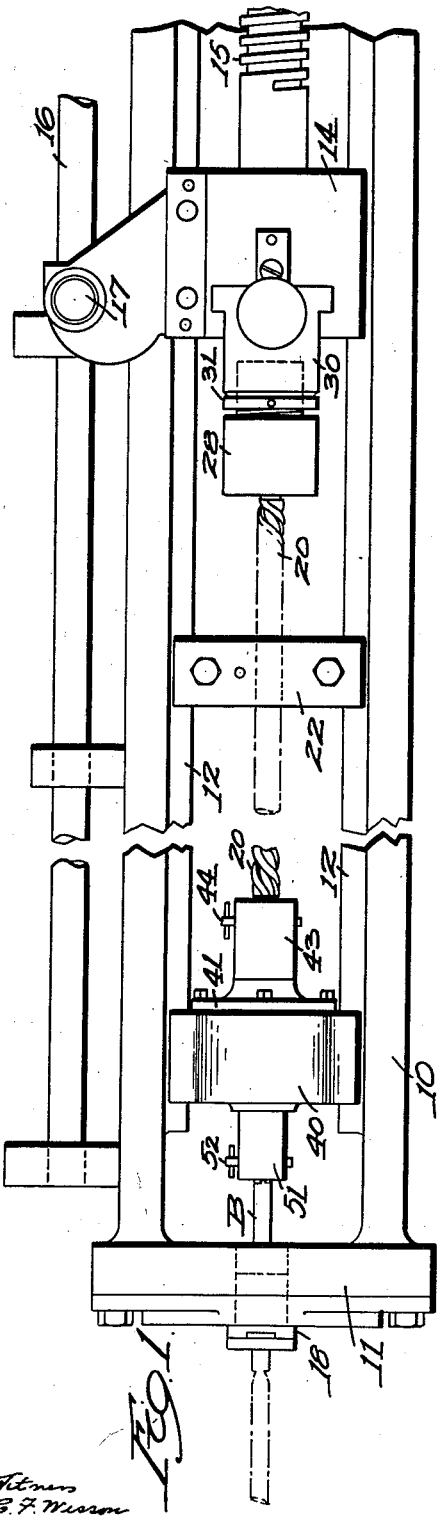
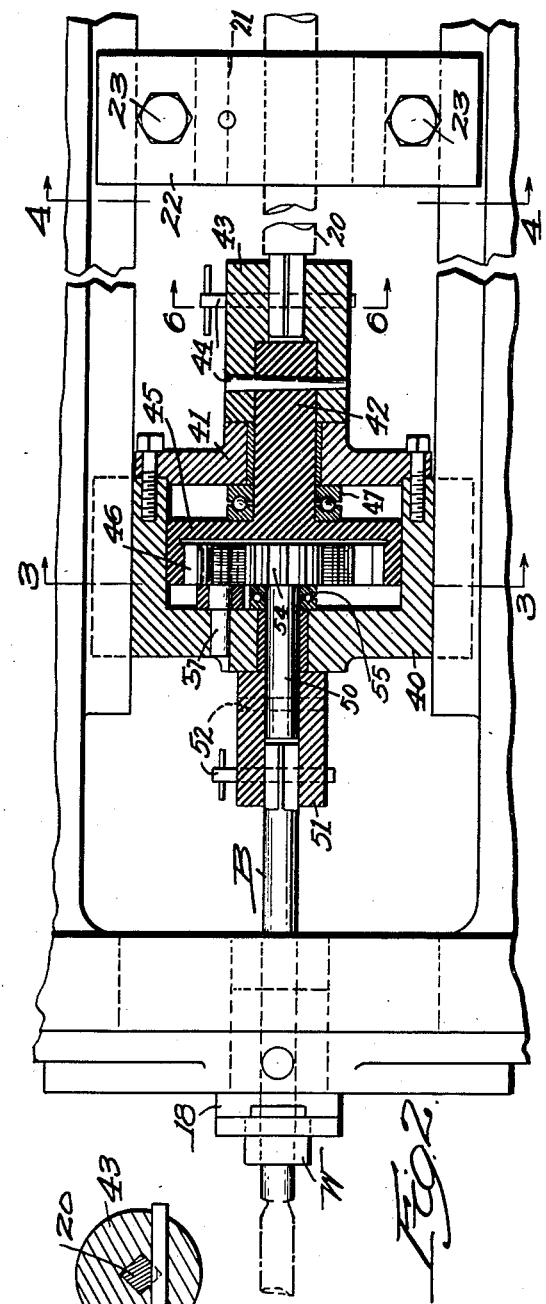
Inventor
Albert Forberg

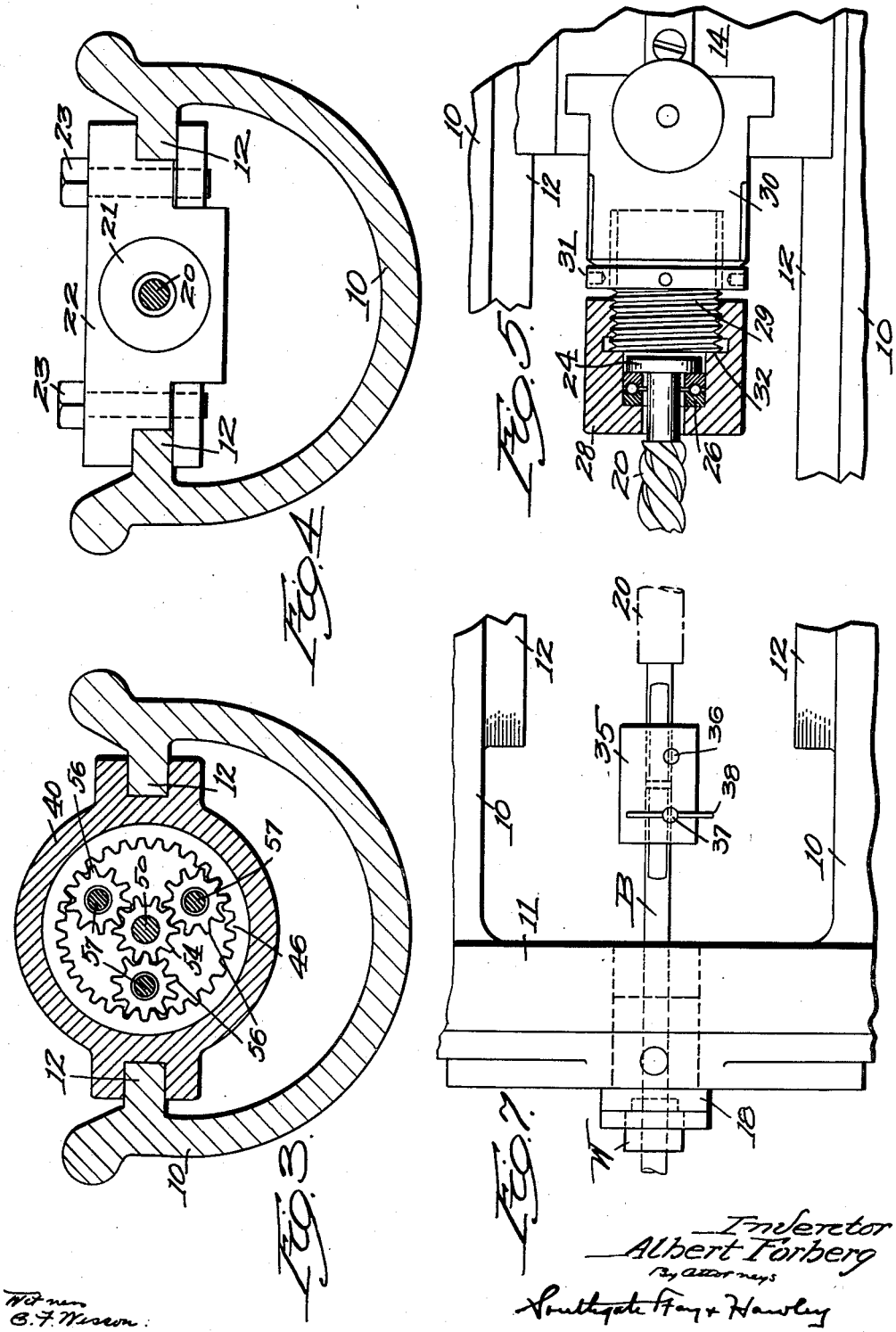

Patented Mar. 4, 1930

1,749,633

UNITED STATES PATENT OFFICE

ALBERT FORBERG, OF HUDSON, MASSACHUSETTS, ASSIGNOR TO THE LAPOINTE MACHINE TOOL COMPANY, OF HUDSON, MASSACHUSETTS, A CORPORATION OF MAINE

MACHINE FOR BROACHING SPIRALS

Application filed January 27, 1928. Serial No. 250,056.

This invention relates to a machine designed for producing spirals by a broaching operation.

It is the general object of my invention to provide a machine by which an internal spiral groove, rib or thread may be produced by a single straight line broaching operation, instead of requiring extended threading or grinding machine operations.

It is a further object of my invention to provide a broaching machine in which the broach will be given a positive and definite rotary movement as it is moved axially. I have also provided means by which the broach may be rotated in definite relation to the movement of a master screw but at an increased speed if desired.

My invention further relates to arrangements and combinations of parts which will be hereinafter described and more particularly pointed out in the appended claims.

Preferred forms of the invention are shown in the drawings in which

Fig. 1 is a plan view of one form of my invention;

Fig. 2 is an enlarged sectional plan view of the sliding cross-head and gear connection;

Figs. 3 and 4 are transverse sectional elevations, taken along the lines 3—3 and 4—4 in Fig. 2;

Fig. 5 is a plan view, partly in section, of the cross-head of the machine;

Fig. 6 is a detail sectional view, taken along the line 6—6 in Fig. 2; and

Fig. 7 is a partial plan view of a simplified form of the machine.

Referring to the drawings, I have shown in Figs. 1 to 6 inclusive a machine designed for broaching work in which the pitch of the spiral is relatively small. In Fig. 7 I have shown a modification in which the machine is simplified for broaching work in which the spiral is relatively steep and the pitch is relatively large.

Referring to Figs. 1 to 6, I have shown a broaching machine comprising a frame 10 having a fixed face plate or cross frame member 11 and having ribs or guideways 12 extending longitudinally within the frame. A crosshead 14 is mounted on the guideways 12 and is moved longitudinally during the broaching operation by a lead screw 15, actuated by the usual rotating nut, not shown. A rod 16 is provided, adapted to be engaged by a dog or stud 17 on the cross-head 14, thus limiting the movement of the cross-head in both directions.

A suitable chuck or work holder 18 is provided on the cross frame member 11, by which the work W may be supported and held from rotation.

The parts thus far described are in general of the usual construction and in themselves form no part of my present invention.

A master screw 20 is mounted in a master nut 21 (Fig. 4) which is secured in a supporting member 22 which is longitudinally adjustable on the guideways 12 and which may be clamped in any desired position by bolts 23.

The master screw 20 is provided with a head 24 (Fig. 5) engaging an anti-thrust bearing 26 in a cap 28 which is mounted on a threaded member 29, which in turn is threaded into a block 30, mounted on the cross-head 14. A lock nut 31 is provided for holding the member 29 from rotation in the block 30 and the cap 28 has a shoulder 32 firmly seated against the end of the member 29.

The master screw 20 is thus connected for axial movement with the cross-head 14 but is free to rotate relatively thereto and in fact must rotate at a predetermined ratio as it is drawn through the fixed master nut 21.

When the spiral to be broached has a sufficiently sharp lead, the shank of the broach B may be directly connected by a coupling 35 (Fig. 7) to the end of the master screw 20. Such a connection may be conveniently provided by squaring the ends of the broach and master screw, and securing the squared ends in a square opening in the connection 35 by inserting cross pins 36 and 37, the latter pin being provided with a handle portion 38 and being removable to release the broach.

In this construction, as the broach is moved axially with the draw-head 14 and master screw 20, it also receives a rotary motion identical with that of the screw 20. If provided with correspondingly inclined broaching teeth, it will broach an internal spiral groove, rib or thread in the work W.

If the spiral to be broached is of fine pitch, so that a corresponding master screw could not be reversely rotated by drawing it through the nut 21, I then make use of the construction shown more particularly in Figs. 1, 2 and 3, by which the speed of rotation of the broach is increased relative to that of the master screw.

In this construction, I provide a cross-head 40 slidable on the guideways 12 and supporting a bearing 41 for a rotatable member 42. One end of the member 42 is connected by a sleeve 43 and cross pins 44 to the shank of the master screw 20. The opposite end of the member 42 is enlarged to form a disc 45, supporting an internal gear 46. An anti-friction thrust bearing 47 is inserted between the disc 45 and the bearing member 41.

The cross head 40 also provides a bearing for a short shaft 50 which is connected by a sleeve 51 and cross pins 52 with the shank of the broach B. A pinion 54 is formed on the inner end of the shaft 50 and a thrust bearing 55 is interposed between the pinion 54 and the cross-head 40.

A plurality of intermediate pinions 56 (Fig. 3) are mounted on studs 57 (Fig. 2) fixed on the cross-head 40. The gear 46, pinion 54 and intermediate pinions 56 thus form a system of planetary gearing by which the broach is rotated at a definitely increased speed over the rotation of the master screw 20.

If the pitch diameter of the pinion 54 is one-third of the pitch diameter of the internal gear 46, the broach will rotate three times as fast as the lead screw 20 and in the opposite direction. It is thus necessary to provide a left-hand master screw to broach a right hand spiral when using the construction shown in Figs. 2 and 3, while a right hand master screw will be used to broach a right hand spiral when directly connected as in Fig. 7.

Both forms of the machine are used in the same manner as an ordinary broaching machine, the work being secured in the holder 18 and the shank of the broach being inserted through the work and clamped in the connection 35 or 51, and being thereafter pulled longitudinally through the work, while at the same time it is rotated through the cooperation of the master screw 20 and master nut 21. The pitch of the spiral will be determined by the pitch of the master screw 20 and by the pitch ratio between the gear 46 and the pinion 54.

I have thus provided means by which spirals varying from steep pitch to fine pitch may be produced by a single longitudinal movement of a broach, which is positively rotated in predetermined relation to this longitudinal movement. Such an operation may be very easily and quickly performed and the work may be turned out very rapidly.

Having thus described my invention, I do not wish to be limited to the details herein disclosed otherwise than as set forth in the claims but what I claim is:—

1. In a broaching machine, means to hold the work from rotation, a broach, a master screw, means to cause said screw to move longitudinally and to rotate in predetermined relation to its longitudinal movement, and means connecting said screw to said broach, said connecting means comprising a sliding cross head movable along guides in said machine and in which said screw and said broach have aligned bearings, and planetary gears mounted in said cross head and connecting said screw and broach in a definite speed relation.

2. The combination in a broaching machine as set forth in claim 1, in which said gearing comprises an internal gear rotatable with said master screw, a pinion connected to said broach, and a plurality of intermediate pinions mounted on said cross head and providing a driving connection between said internal gear and said first mentioned pinion.

3. In a broaching machine, means to hold the work from rotation, a broach, means to move said broach longitudinally through the work, guides on said machine upon which said latter means travels, a master screw, means to cause said screw to rotate in predetermined relation to the longitudinal movement of the broach, a cross head mounted on said guides and between said screw and broach for movement therewith, and a gear connection on said cross head between said screw and broach effective to cause the broach to rotate at an increased speed definitely related to the movement of said master screw.

4. In a broaching machine, means to hold the work from rotation, a broach, a master screw, means to cause said screw to move longitudinally and to rotate in predetermined relation to its longitudinal movement, guides in said machine for said screw moving means, a cross head mounted on said guides and between said screw and broach for movement therewith and a gear connection on said cross head between said screw and broach effective to cause said broach to move longitudinally with said master screw and to rotate in a definitely increased speed relation to said master screw and in the opposite direction.

5. In a broaching machine, means to hold the work from rotation, a broach, a master screw, means to cause said screw to move longitudinally and to rotate in predetermined relation in its longitudinal movement, guides in said machine for said screw moving means, a cross head mounted on said guides and between said screw and broach for movement therewith, and a planetary gear connection on said cross head between said screw and said broach effective to cause the broach to move longitudinally with said master screw and to rotate in a definitely increased speed relation to said master screw.

In testimony whereof I have hereunto affixed my signature.

ALBERT FORBERG.